US010899057B2

(12) United States Patent
Bock et al.

(10) Patent No.: US 10,899,057 B2
(45) Date of Patent: Jan. 26, 2021

(54) UNIVERSAL PLATE

(71) Applicant: MHT Mold & Hotrunner Technology AG, Hochheim (DE)

(72) Inventors: David Bock, Hochheim am Main (DE); Peter Süß, Messel (DE)

(73) Assignee: MHT Mold & Hotrunner Technology AG, Hochheim (DE)

( * ) Notice: Subject to any disclaimer, the term of this patent is extended or adjusted under 35 U.S.C. 154(b) by 0 days.

(21) Appl. No.: 16/408,600

(22) Filed: May 10, 2019

(65) Prior Publication Data
US 2019/0351597 A1 Nov. 21, 2019

(30) Foreign Application Priority Data

May 17, 2018 (DE) .......................... 10 2018 111 875

(51) Int. Cl.
*B29C 45/40* (2006.01)
*B29C 49/06* (2006.01)
B29C 45/26 (2006.01)
B29K 67/00 (2006.01)
B29L 31/00 (2006.01)

(52) U.S. Cl.
CPC ............ *B29C 45/40* (2013.01); *B29C 49/061* (2013.01); *B29C 2045/2683* (2013.01); *B29C 2045/4068* (2013.01); *B29K 2067/003* (2013.01); *B29L 2031/7158* (2013.01)

(58) Field of Classification Search
CPC .... B29C 2045/2683; B29C 2045/4068; B29C 45/1628; B29C 2045/1632; B29C 2045/1631; B29C 45/40; B29C 49/061
See application file for complete search history.

(56) References Cited

U.S. PATENT DOCUMENTS 5,728,409 A * 3/1998 Schad ................... B29C 45/045
264/297.8
5,750,162 A * 5/1998 Schad ................... B29C 45/045
425/533
6,143,225 A * 11/2000 Domodossola ....... B29C 45/045
264/237

(Continued)

FOREIGN PATENT DOCUMENTS

DE  10 2010 018 121 A1  10/2011
DE  10 2012 102 266 A1   9/2013

(Continued)

OTHER PUBLICATIONS

Search Report dated Oct. 25, 2018, issued in corresponding German Patent Application No. 10 2018 111 875.9.

(Continued)

*Primary Examiner* — Xiao S Zhao
*Assistant Examiner* — Emmanuel S Luk
(74) *Attorney, Agent, or Firm* — Morgan, Lewis & Bockius LLP (57) ABSTRACT

The present invention concerns a handling plate for handling or aftertreatment of a plurality of mouldings, wherein the handling plate has a plurality of handling and/or aftertreatment tools arranged in columns and rows. In order to provide a treatment plate which can be used in relation to different tools it is proposed according to the invention that the spacings between the handling and/or aftertreatment tools are variable within the columns and/or within the rows.

21 Claims, 5 Drawing Sheets

(56) References Cited

U.S. PATENT DOCUMENTS

| | | | | |
|---|---|---|---|---|
| 6,171,541 | B1* | 1/2001 | Neter | B29C 35/16 264/328.14 |
| 7,306,452 | B2* | 12/2007 | Lausenhammer | B29C 45/7207 425/526 |
| 8,246,338 | B2* | 8/2012 | Zoppas | B29C 45/4225 425/190 |
| 8,696,347 | B2* | 4/2014 | Neter | B29C 45/7207 425/547 |
| 8,926,303 | B2* | 1/2015 | Schad | B29C 45/34 425/139 |
| 9,956,708 | B2 | 5/2018 | Thoemmes et al. | |
| 10,052,804 | B2* | 8/2018 | Schad | B29C 45/7207 |
| 10,124,522 | B2* | 11/2018 | Schad | B29C 45/4225 |
| 10,213,946 | B2* | 2/2019 | Schad | B29C 45/7207 |
| 2003/0003187 | A1* | 1/2003 | Coran | B29C 45/4225 425/547 |
| 2003/0170338 | A1* | 9/2003 | Coran | B29C 49/4205 425/552 |
| 2003/0205841 | A1* | 11/2003 | Neter | B29C 45/7207 264/237 |
| 2005/0142244 | A1* | 6/2005 | Unterlander | B29C 45/045 425/547 |
| 2007/0157545 | A1* | 7/2007 | Zoppas | B29C 45/1769 52/749.1 |
| 2007/0212441 | A1* | 9/2007 | Ansari | B29C 45/4225 425/533 |
| 2007/0264385 | A1* | 11/2007 | McCready | B29C 45/42 425/547 |
| 2008/0093770 | A1* | 4/2008 | Zoppas | B29C 45/4225 264/232 |
| 2008/0256789 | A1 | 10/2008 | Fisch et al. | |
| 2008/0290561 | A1* | 11/2008 | Gaiser | B29C 45/26 264/328.8 |
| 2010/0025188 | A1* | 2/2010 | Lanfranchi | B29C 37/001 198/377.08 |
| 2012/0038076 | A1* | 2/2012 | Lausenhammer | B29C 45/2675 264/39 |
| 2015/0314503 | A1* | 11/2015 | De Cuyper | B29C 45/1625 428/36.92 |
| 2017/0157800 | A1* | 6/2017 | De Cuyper | B29C 45/162 |

FOREIGN PATENT DOCUMENTS

| | | |
|---|---|---|
| DE | 11 2013 001 398 T5 | 12/2014 |
| EP | 1 215 031 A1 | 6/2002 |

OTHER PUBLICATIONS

Extended European Search Report issued in corresponding European Patent Application No. 19173517.4, dated Sep. 26, 2019.

* cited by examiner

| ID | Marking | Number of Cavities | s | r | Number of rows | Number of cavities per row | Number of intermediate jumps |
|---|---|---|---|---|---|---|---|
| 1 | White | 96 | 60 | 140 | 8 | 12 | 0 |
| 2 | Green | 72 | 50 | 140 | 6 | 12 | 2 |
| 3 | Orange | 72 | 60 | 140 | 6 | 12 | 0 |
| 4 | Yellow | 128 | 50 | 111 | 8 | 16 | 2 |
| 5 | Red | 48 | 60 | 152 | 4 | 12 | 0 |
| 6 | Blue | 72 | 50 | 120 | 6 | 12 | 0 |

Fig. 6

UNIVERSAL PLATE

The invention concerns a handling plate for handling or aftertreatment of a plurality of mouldings, wherein the handling plate has a plurality of handling and/or aftertreatment tools arranged in columns and rows. Such a handling plate which is in the form of an injection moulding tool plate for use in an injection moulding tool for the production of preforms is known from DE 10 2012 102 266 A1.

Injection moulding is one of the most important methods of manufacturing mouldings or mould portions. In that case the moulding material which is generally originally present in the form of powder or granular material is heated, plasticised and urged under high pressure into a suitable moulding tool. The moulding material sets in the moulding tool and is then removed from the opened tool. For example commercially usual PET bottles are produced by stretch blow moulding of a hollow body preform. In that case the hollow body preform is produced in a first step by means of injection moulding. The stretch blow moulding operation which follows the injection operation can be effected either directly after production of the preform or at a later time.

A high level of effort and outlay is required in the production of the appropriate injection moulding moulds as the injection moulding mould on the one hand has to be designed for very high pressures while on the other hand it must have suitably heated and/or cooled passages.

Even if the present invention in principle could be used in injection moulding tools of any kind it is described hereinafter with reference to an injection moulding tool for the production of PET preforms. Such injection moulding tools have a large number, for example 96, of cavities which are disposed in a so-called cavity plate and which are introduced into the appropriately designed tool cores arranged on a so-called core plate. When the tool is closed, that is to say when the core is fitted into the corresponding cavity, a space, the so-called mould cavity, is formed between the core on the one hand and the cavity on the other hand. The plasticised plastic material is then injected into that mould cavity under high pressure. As soon as the preform has sufficiently cooled the mould can be opened and the preform removed. In order to reduce the cycle times, that is to say the time from one injection operation to the next it is already usual for the preform to be removed from the mould at a very early moment in time, at which the preform is already solid at its outside surfaces, but the internal region thereof is still fluid. In that state the preform is generally transferred into a so-called removal plate which has a set of receiving cavities. In that situation the set of receiving cavities includes at least as many receiving cavities as the tool has cores or cavities so that the set preform can be transferred from each core into a receiving cavity. During the next injection moulding operation the previous preforms remain in the receiving cavities, which are usually cooled.

Configurations are also known in which the individual preforms are removed from the mould by means of a gripper unit and transferred into the removal plate which is disposed outside the tool mould. Structures are also known in which the preforms are transferred from the removal plate into an intermediate plate.

As the preform has to remain for a comparatively long time for cooling purposes in the receiving cavity in the state of the art so that generally the next preform can already be removed from the injection moulding tool before the preform in the receiving cavity has cooled down to such an extent that it can be removed without the risk of damage it is already usual to use removal plates which have a plurality of sets of receiving cavities, wherein each set has as many receiving cavities as the injection moulding tool provides preforms in each injection cycle. The individual sets of receiving cavities are then successively fitted with preforms so that the individual preform can remain in the receiving cavity for longer than an injection moulding cycle.

In the production of preforms the injection moulding tools have two tool halves which can be reciprocated between an open and a closed position. \the one tool half has the so-called cavity plate having a plurality of cavities arranged in columns and rows, wherein the spacing r between adjacent cavities within the rows is greater than the spacing s between adjacent cavities within the columns. The other tool half has a core plate having corresponding cores which in the closed state of the tool mould are disposed within the cavities. Therefore the cores are also arranged in a plurality of columns and rows, the spacings between adjacent cores corresponding to spacings between the cavities.

It will be appreciated that the spacing of the receiving cavities of the removal plate and the spacing of the handling elements of an aftertreatment plate must correspond to the spacing of the cavities and the cores in the tool halves.

In principle it is a matter for the manufacturer of the injection moulding halves to establish the spacings in the column and row directions. In that respect under some circumstances account has to be taken of the layout of the hot runner in the tool half. In addition the number of cores of the core plate and the cavities of the cavity plate differ from one tool to another.

Figure 6:
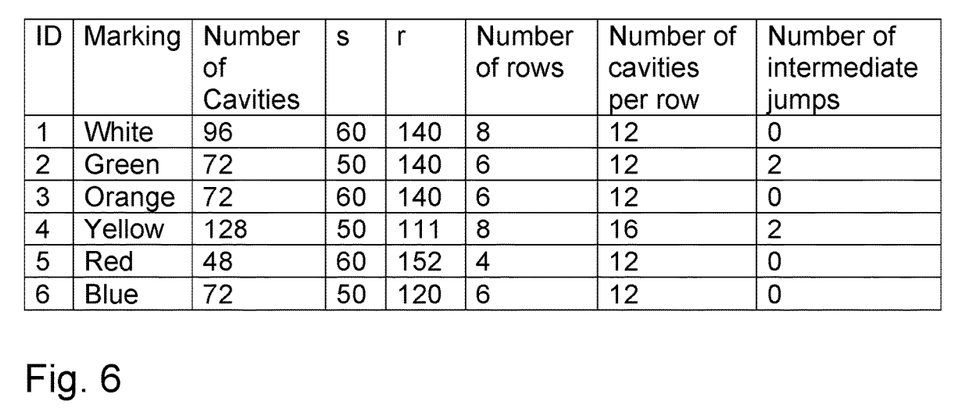
FIG. 6 lists altogether six examples for conventional injection moulding tools.

FIG. 6 lists altogether six examples for conventional injection moulding tools. Thus for example tools having 96 cavities (cavity number 96), in which the cavities in the column direction are at a spacing of 60 mm and in the row direction a spacing of 140 mm. That tool has eight rows, wherein twelve cavities are arranged in each row.

In particular the cavity plate and the core plate are more frequently replaced in the known injection moulding tools. That is necessary for example if the plates are worn. It will be noted however that replacement frequently occurs even when the plates are still alright because the tool user would possibly like to manufacture other preforms or more preforms per injection moulding cycle. In any case the tool halves are then to be appropriately replaced. If the replaced tool halves involve different spacings in the row and/or column direction then the removal plate and the aftertreatment plate also have to be correspondingly substituted. That is complicated and expensive. In particular when the user would like to alternately produce different preforms with one and the same injection moulding tool then in each change not only the tool halves but also the removal plate and the aftertreatment plate have to be changed.

Taking the described state of the art as the basic starting point the object of the present invention is therefore to provide a treatment plate which can be used in relation to different tools.

According to the invention that object is attained by a handling plate of the kind set forth in the opening part of this specification, in which the spacings between the handling and/or aftertreatment tools are variable within the columns and/or within the rows.

By virtue of the fact that the spacings can be changed the handling plate can be easily adapted to different injection moulding tools involving different spacings between the cores and cavities in the column direction and/or the row direction. That saves on costs and reduces the otherwise necessary stockkeeping of handling plates with different spacings between the handling and/or aftertreatment tools.

In that respect the handling plate is particularly preferably of such a configuration that the spacings can be changed both within the columns and/or within the rows.

In a preferred embodiment the handling plate has a base element and a plurality of carrier elements which are or can be fixed to the base element, wherein each carrier element has tool receiving means for receiving handling and/or aftertreatment tools. A receiving means can be for example a bore to which a handling and/or aftertreatment tool can be fixed.

For example the carrier elements can respectively carry all handling and/or aftertreatment tools arranged in a column or can have appropriate receiving means for that purpose.

By virtue of a relative movement of a carrier element relative to the base element therefore the complete column of handling and/or aftertreatment tools can be moved relative to the base element.

The base element can be of a multi-part structure. For example the base element can be composed of a plurality of profile portions. Alternatively however the base element can also be in one piece, for example in the form of a plate.

Preferably at least one carrier element can be fixed to the base element in a first and in a second position.

By way of example fixing at two different positions could be provided for each carrier element so that, when all carrier elements are fixed at their first position, the spacing between adjacent columns is greater or smaller than in a situation in which all carrier elements are fixed at their second position. In the best-case scenario the carrier elements can be fixed to the base element in any intermediate position between the first and the second positions. That stepless fixing option affords the greatest flexibility for the handling plate. It will be noted that when mounting the carrier elements on the base element very accurate adjustment must be implemented. If the spacings between the individual adjacent rows of handling and/or aftertreatment tools should not be exactly correct then the injection moulding tool and/or the handling plate can be damaged in operation.

It can therefore be advantageous if, for the usual spacings as shown for example in FIG. 6, appropriate positions are predetermined and in the best-case scenario are appropriately marked. For example the base element could have suitable bores with which the carrier elements can be fixed to the base element. In that case the base element can have a plurality of sets of bores, wherein each set is suitably marked, for example by means of a coloured marking. By means of an association table the user can then select the appropriate marking for a given type of tool and can fix the carrier elements in the bores marked for that purpose on the base element.

In addition in an advantageous embodiment it is provided the tool receiving means of the carrier elements are of such a configuration that a plurality of handling and/or aftertreatment tools can be fixed to the carrier elements at different spacings. In other words here it is not only the carrier elements that are arranged in different positions relative to each other, but in addition the receiving means or handling and/or treatment tools can be arranged at different spacings on a carrier element.

In a preferred embodiment the tool receiving means can be fixed to the carrier element in two different positions and any position therebetween. By way of example the carrier element could have a groove and the handling and/or aftertreatment tools could have suitable slot blocks which can be displaced within the groove in order to fix the tools at the desired position.

In a further preferred embodiment it is provided that the tool receiving means of the carrier elements are arranged along a carrier element axis, wherein each carrier element has at least two and preferably four receiving surfaces, wherein tool receiving means are arranged on each receiving surface along the carrier element axis, wherein the spacings between the tool receiving means in the receiving surfaces differ.

In a further preferred embodiment it is provided that a plurality of sets of tool receiving means are provided on a receiving surface, wherein the sets differ by different spacings between adjacent tool receiving means. A different spacing between the tool receiving means can then be implemented by the choice of another set of tool receiving means. Optionally the carrier element has to be displaced relative to the base element or rotated through 180° about an axis perpendicular to the base element, for that purpose.

If the receiving means are formed by bores it can easily be appreciated that the carrier elements can be fixed to the base element in different positions which differ by rotation of the carrier element about its carrier element axis, in which case then a respective different receiving surface is arranged facing away from the base element and that receiving surface has correspondingly spaced bores. The spacing between the handling and/or aftertreatment tools can thus be effected by releasing the carrier elements from the base element, rotating the carrier elements about the carrier element axis and again fixing the carrier elements to the base element.

In a further preferred embodiment it is provided that the carrier elements are in the form of hollow chamber profile members of polygonal cross-section, preferably of rectangular cross-section.

Hollow chamber profile members are inexpensive to produce and enjoy adequate stability. By virtue of the fact that they are of a polygonal cross-section they can be rotated about the carrier element axis and again fixed to the base element.

The use of hollow chamber profile members also has the advantage that the profile members frequently provide a plurality of hollow chambers so that a hollow chamber is associated with each receiving surface. That makes it possible for the hollow chambers of the hollow chamber profile member to be used as a fluid supply or fluid discharge means. In that way the tool receiving means can be so designed that it has a fluid communication with the associated hollow chamber. For example the receiving means could be in the form of a bore connecting the receiving surface to the associated hollow chamber.

In a further preferred embodiment there is provided at least one closure element with which the fluid communication between the tool receiving means and the associated hollow chamber is closable.

If for example a plurality of different tool recipients means are connected to the hollow chamber then the receiving means which are not required have to be closed by means of the closure element in order to prevent fluid which is supplied or discharged by way of the hollow chamber from escaping by way of the receiving means which are not required.

In addition there are tools with a so-called intermediate jump, that is to say in which a core or a cavity is missing within a row or column of cavities or cores so that the spacing between adjacent cores and cavities in the region of the intermediate jump is twice as great. That intermediate jump can be implemented with the system according to the invention by a tool receiving means being closed with the closure element.

In addition intermediate jumps are also conceivable, in which the spacing between adjacent cores and cavities in the region of the intermediate jump is not twice as great but is for example 1.3 times as great as the other spacing between adjacent cores and cavities.

In that case a tool receiving means cannot be simply closed. Either the tool receiving means have to be steplessly adjustable or a suitable set of receiving means has to be afforded. For example the carrier element could have a receiving surface which does not have any receiving means into which however if required suitable bores serving as receiving means can be introduced.

The handling and/or aftertreatment tools can be receiving cavities for receiving preforms. In that case the handling plate according to the invention is displaced between the opened tool halves when the corresponding preforms are to be removed there.

Therefore different injection moulding tools can be serviced with one and the same handling plate.

In a further embodiment it is provided that the handling and/or aftertreatment tools are gripping tools for gripping preforms, cooling pins which are provided to be moved into the interior of a preform in order there either to supply a fluid or to suck a fluid away, and/or embossing tools which are provided to be introduced into the interior of a preform in order there to come into contact with the preform and change the shape thereof.

For example the removal plate could have three sets of receiving cavities, wherein a set of preforms is transferred into a set of receiving cavities whenever the removal plate is moved into the opened tool. In the subsequent movement into the tool the preforms are then transferred into the second set of recipients cavities and in the third occasion of movement into the tool transferred into the third set of receiving cavities. The cycle is then repeated, that is to say a first set of receiving cavities is again transferred.

While the removal plate is not positioned between the opened tool plates the preform which is held in the receiving cavity can be processed. By way of example cooling pins could be introduced into a first set of preforms, by way of which pins a cooling fluid can either be introduced into the preform or can be sucked therefrom. The consequence of this is that the inside surface of the preform is cooled more quickly.

Furthermore at the same time gripping tools could engage a second set of preforms, which has remained longest in the aftertreatment tool, as that has to be removed next.

Finally there are situations of use in which the preform is stretched in the aftertreatment plate. A suitable embossing tool could be provided for that purpose, the tool engaging into a third set of preforms which has just left the injection moulding tool and is therefore still at the highest temperature.

The present invention further concerns an injection moulding tool having a removal plate and/or an intermediate plate and/or an aftertreatment plate designed in accordance with the handling plate according to the invention.

Further advantages, features and possible uses of the present invention will be apparent from the description hereinafter of a preferred embodiment and the accompanying Figures in which.

Figure 1:
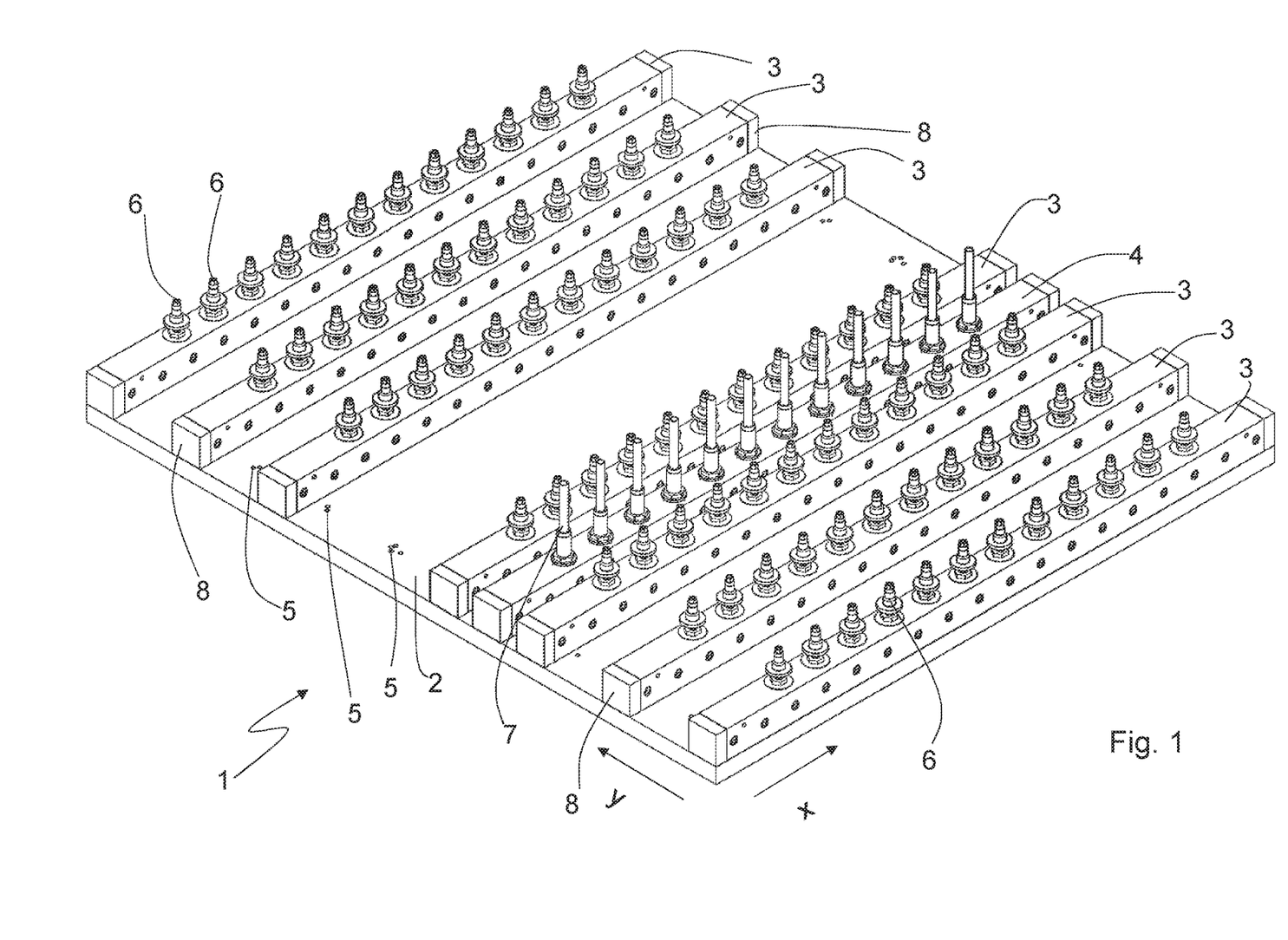
FIG. 1 shows a perspective view of a handling plate according to the invention.

FIG. 1 shows a handling plate 1 according to the invention. That handling plate 1 has a base element 2 in the form of a plate. A multiplicity of carrier elements 3 are arranged on the base element 2. Provided on the base element 2 are a multiplicity of positioning bores 5 which can be used for positioning the carrier elements 3 on the base element 2. Thus it is possible to insert into the positioning bores corresponding pins which also engage into corresponding positioning bores in the carrier elements 3.

In the illustrated embodiment the base element 2 has various groups of bores 5 which are arranged in such a way that the spacing in the y-direction between the individual carrier elements, when using different groups of bores, is of different magnitude. In the illustrated embodiment a total of seven carrier elements 3 are connected at a first group of bores 5 to the base element 2. Between the third and fourth carrier elements (viewed from the left) a carrier element is omitted so that the spacing between the third and fourth carrier elements (viewed from the left) is twice as great as between the other carrier elements 3. In the illustrated example each carrier element 3 has twelve gripper elements 6 arranged in the x-direction in a column. The spacing between adjacent gripper elements 6 is everywhere the same. The gripper elements engage into hollow chamber mouldings held in a receiving plate. In the illustrated embodiment the gripper elements 6 are compressed air-operated so that, when the gripper element is acted upon with compressed air, it extends and engages the inside of the preform. By virtue of a relative movement between the handling plate 1 and the removal plate (not shown) the hollow body mouldings held by the gripper elements 6 can be removed from the removal plate. Alternatively the gripper elements could also be of such a nature that they can be activated by means of vacuum.

Frequently the removal plate has more receiving cavities than preforms produced in an injection moulding cycle. For example the removal plate can have twice as many receiving cavities so that there are two sets of receiving cavities which are fitted with preforms alternately. That has the advantage that the preforms can remain for longer in the removal plate before they have to be removed again in order to provide space for the next set of preforms.

During the time in which the preforms are held in the removal plate cooling of the preform can be speeded up by means of a cooling pin 7, by way of which a cooling fluid is fed into the interior of the hollow body preform or air is sucked therefrom.

For that purpose the handling plate 1 according to the invention has a further carrier element 4 which in the illustrated example is arranged between two carrier elements 3 which carry a gripper element. The spacing between adjacent gripper element 6 of a carrier element 3 and the cooling pin 7 of a carrier element 4 is exactly half as great in the illustrated example as the spacing between two gripper elements 6 spaced in the y-direction. The consequence of that is that the gripping elements engage into each second receiving cavity of the removal plate while the cooling pin 7 engages into the cavity therebetween in order to cool the hollow body performs contained therein.

Figure 2:
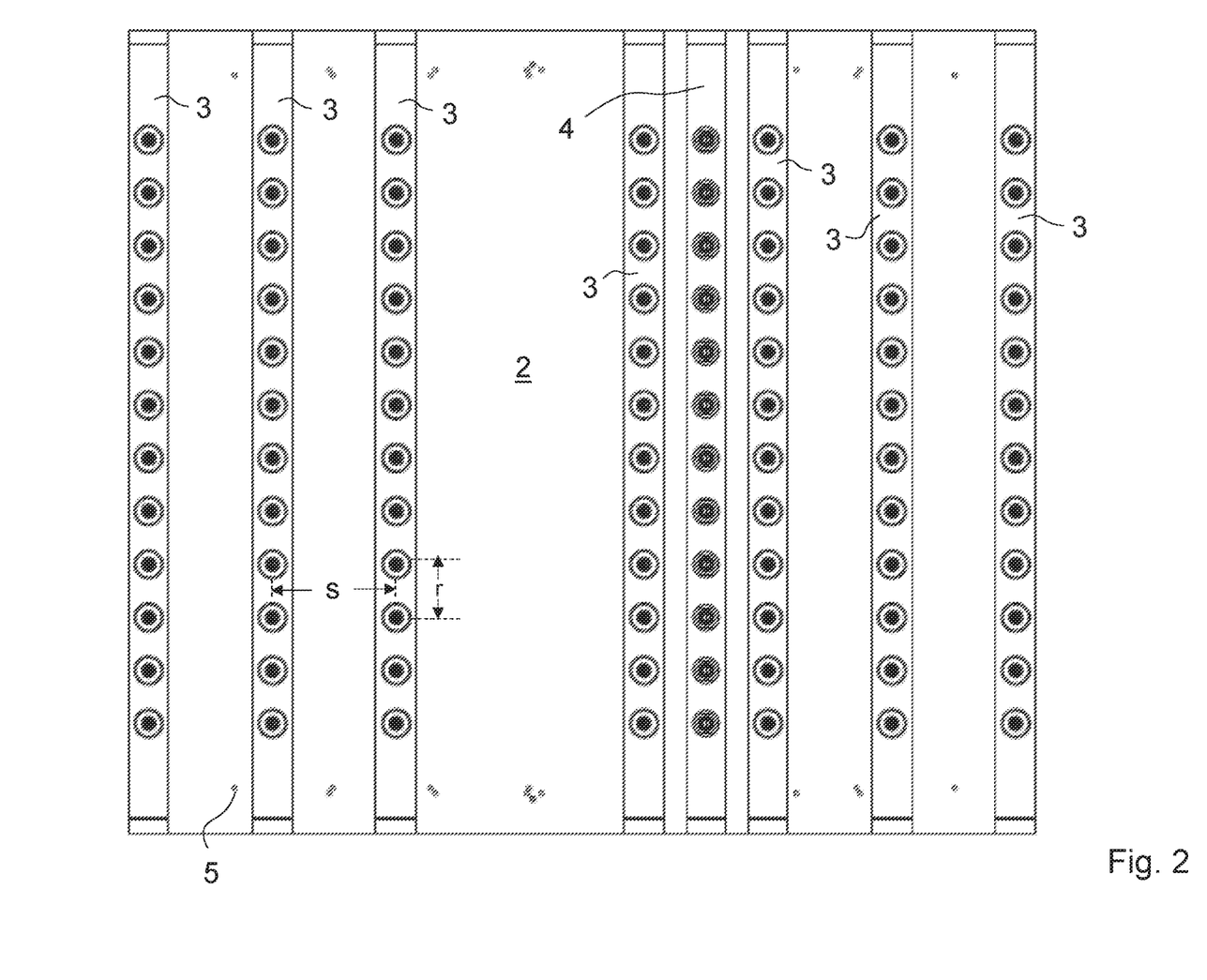
FIG. 2 shows a plan view of the handling plate of FIG. 1.
Figure 3:
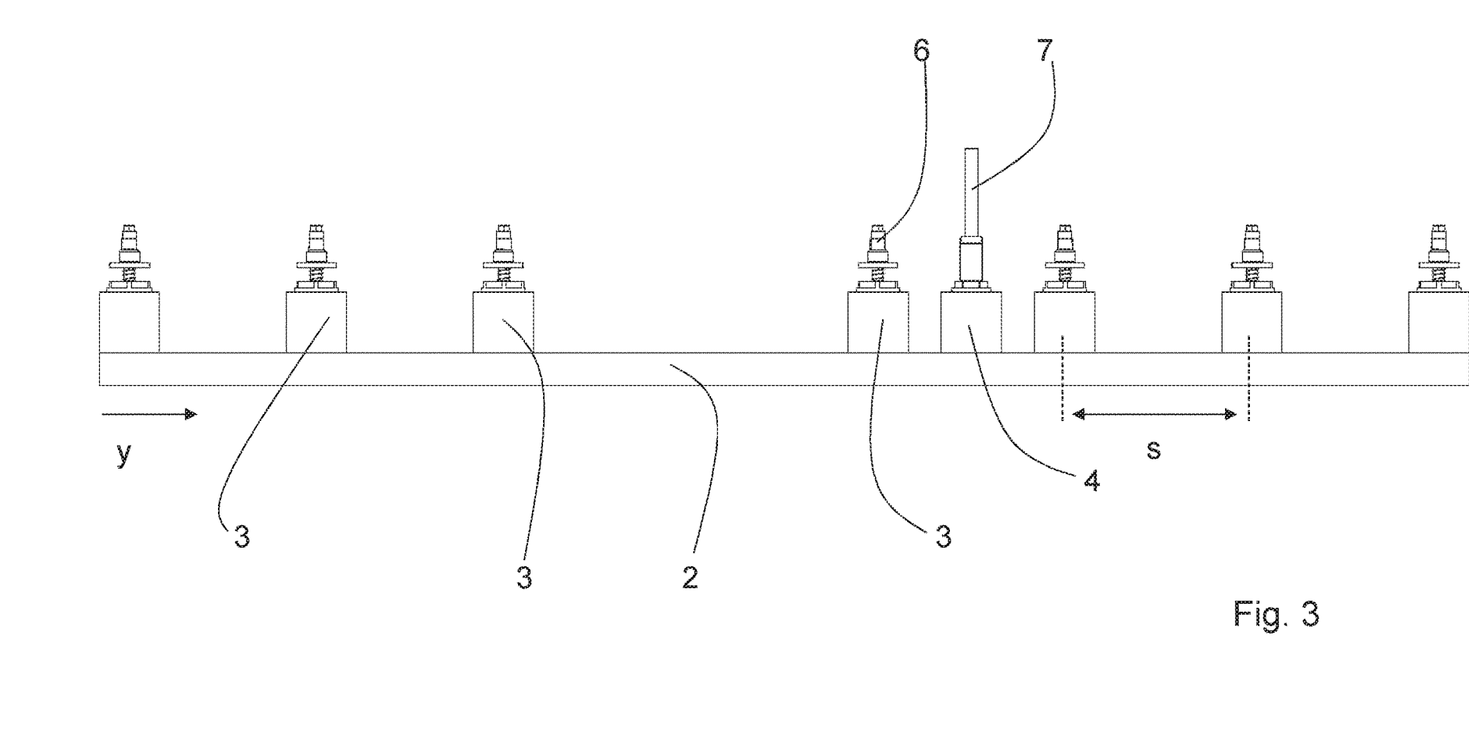
FIG. 3 shows a side view of the handling plate of FIG. 1.

Basically, in the embodiment shown in FIG. 1, there would have to be further carrier elements 4 which are respectively arranged between or beside a carrier element 3 which carries gripper elements 6. For the sake of clarity of the drawing however they have not been shown here. FIGS. 2 and 3 show plan views and side views of the handling plate according to the invention.

Figures 4, 5:
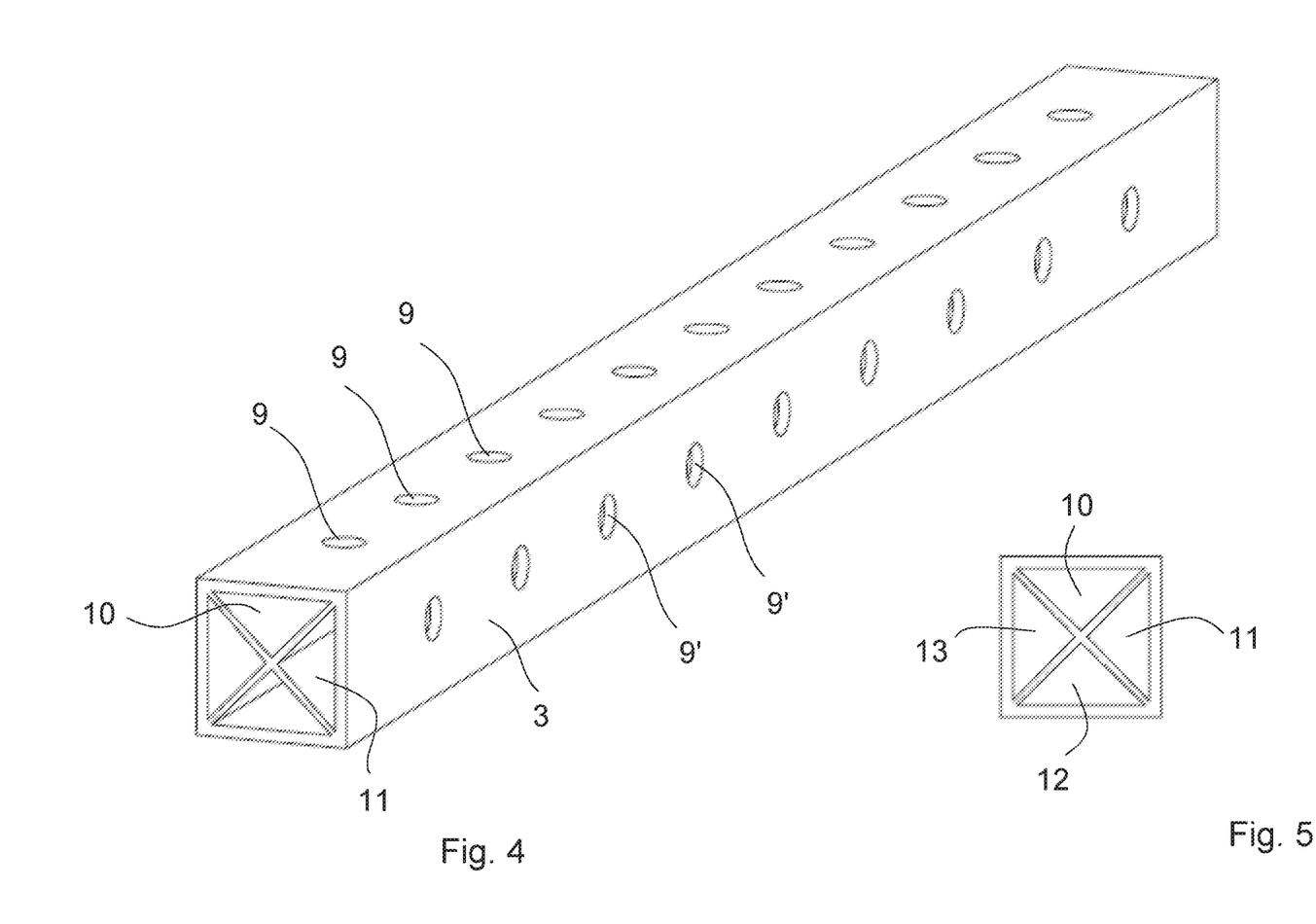
FIG. 4 shows a perspective view of a carrier element.
FIG. 5 shows an end view of the carrier element of FIG. 4.

FIGS. 4 and 5 show a carrier element 3 in detail as a perspective view and a sectional view. It will be seen that each carrier element 3 comprises a hollow chamber profile member. In the illustrated embodiment the hollow chamber profile member itself comprises four hollow chambers 10, 11, 12 and 13. In FIG. 4 the hollow chamber profile member 3 at its top side has a row of bores 9 connecting the upper surface of the hollow chamber profile member to the hollow chamber 10. The gripper elements 6 can be fixed in those bores 9. Compressed air can then be supplied to each gripper element 6 of a column by way of the hollow chambers 10.

It will be seen that at its side surface which faces towards the right in FIG. 4 the carrier element 3 has bores 9' connecting the lateral surface to the hollow chamber 11.

If the spacing between the gripper elements 6 is to be altered the carrier element can be released from the base element 2 and rotated about a longitudinal axis so that now the bores 9' are disposed upwardly, that is to say at the side remote from the base element 2. When now the gripper elements 6 are fixed in the bores 9' now only nine gripper elements can still be arranged within a column, in contrast to the previous eleven gripper elements, but the spacing between the individual gripper elements 6 is greater.

In the same way the other outside surfaces of the hollow chamber profile member can also be provided with correspondingly spaced bores.

The hollow chamber profile member itself does not have to comprise a plurality of hollow chambers. If however all bores are connected to the same hollow chamber then the bores which are not required have to be closed to ensure an effective supply of compressed air.

If, as shown in FIG. 1, aftertreatment pins are fixed to the carrier element 3 then a cooling fluid can be supplied or sucked away by way of the corresponding hollow chamber. The end faces of the carrier element are closed in the illustrated embodiment by closure caps 9.

Furthermore in an embodiment it is possible for a plurality of sets of receiving means, for example a set for receiving gripping tools and a set for receiving cooling means, to be arranged on a carrier element.

LIST OF REFERENCES

1 handling plate
2 base element
3 carrier element
4 carrier elements
5 bores
6 gripper elements
7 cooling pin
8 closure cap
9, 9' bores
10 hollow chamber
11 hollow chamber
12 hollow chamber
13 hollow chamber

The invention claimed is:

1. A handling plate for handling or aftertreatment of a plurality of mouldings, wherein the handling plate has a plurality of handling and/or aftertreatment tools arranged in columns and rows,
  wherein spacings between the handling and/or aftertreatment tools are variable within the columns and/or within the rows,
  wherein the handling plate has a base element and a plurality of carrier elements which are or can be fixed to the base element,
  wherein each carrier element has two receiving means for receiving handling and/or aftertreatment tools,
  wherein the tool receiving means of the carrier elements are arranged along a carrier element axis,
  wherein each carrier element has at least two receiving surfaces,
  wherein the receiving surfaces are arranged in different planes relative to the carrier element axis,
  wherein two tool receiving means are arranged on each receiving surface along the carrier element axis, and
  wherein spacing between the tool receiving means in the receiving surfaces differ.

2. A handling plate according to claim 1, wherein the handling and/or aftertreatment tools are receiving cavities for receiving preforms.

3. A handling plate according to claim 1, wherein the handling and/or aftertreatment tools are gripping tools for gripping a preform, cooling pins which are provided to be moved into an interior of the preform in order there either to supply a fluid or to suck a fluid away, and/or embossing tools which are provided to be introduced into the interior of the preform in order there to come into contact with the preform and change the shape thereof.

4. A handling plate according to claim 1, wherein the handling plate has a base element and a plurality of carrier elements which are or can be fixed to the base element, and wherein each carrier element has tool receiving means for receiving handling and/or aftertreatment tools.

5. A handling plate according to claim 4, wherein the carrier elements can be fixed to the base element in a first and a second position, wherein spacing between adjacent carrier elements in the first position is less than in the second position, and wherein the carrier elements can be fixed to the base element in any intermediate position arranged between the first and second positions.

6. A handling plate according to claim 5, wherein the tool receiving means of the plurality of carrier elements are of such a configuration that each of the plurality of handling and/or aftertreatment tools can be fixed to the carrier elements at different spacings.

7. A handling plate according to claim 5, wherein each carrier element has four receiving surfaces.

8. A handling plate according to claim 4, wherein the tool receiving means of the plurality of carrier elements are of such a configuration that each of the plurality of handling and/or aftertreatment tools can be fixed to the carrier elements at different spacings.

9. A handling plate according to claim 8, wherein each carrier element has four receiving surfaces.

10. A handling plate according to claim 4, wherein each carrier element has four receiving surfaces.

11. A handling plate according to claim 10, wherein the carrier elements have a form of hollow chamber profile members of polygonal cross-section.

12. A handling plate according to claim 11, wherein the hollow chamber profile member provides a plurality of hollow chambers, and wherein each of the plurality of hollow chambers is associated with each receiving surface so that each tool receiving means has a fluid communication with the associated hollow chamber.

13. A handling plate according to claim 12, wherein there is provided at least one closure element with which the fluid communication between the tool receiving means and the associated hollow chamber is closable.

14. A handling plate according to claim 10, wherein the carrier elements have a form of hollow chamber profile members of rectangular cross-section.

15. A handling plate according to claim 14, wherein the hollow chamber profile member provides a plurality of hollow chambers, and wherein each of the plurality of hollow chambers is associated with each receiving surface so that each tool receiving means has a fluid communication with the associated hollow chamber.

16. A handling plate according to claim 15, wherein there is provided at least one closure element with which the fluid communication between the tool receiving means and the associated hollow chamber is closable.

17. A handling plate according to claim 4, wherein the carrier elements have a form of hollow chamber profile members of polygonal cross-section.

18. A handling plate according to claim 17, wherein the hollow chamber profile member provides a plurality of hollow chambers, and wherein each of the plurality of hollow chambers is associated with each receiving surface so that each tool receiving means has a fluid communication with the associated hollow chamber.

19. A handling plate according to claim 18, wherein there is provided at least one closure element with which the fluid communication between the tool receiving means and the associated hollow chamber is closable.

20. A handling plate according to claim 17, wherein the carrier elements have a form of hollow chamber profile members of rectangular cross-section.

21. An injection moulding tool for producing preforms comprising:
a cavity plate and a core plate which can be reciprocated relative to each other between a closed position in which cores of the core plate are arranged within cavities of the cavity plate and an opened position in which the cavity plate is further away from the core plate than in the closed position; and
a removal plate and an aftertreatment plate,
wherein the removal plate can be moved in the opened position between the core plate and the cavity plate to receive the produced preforms, the aftertreatment plate has a plurality of handling and/or aftertreatment tools and the aftertreatment plate can be reciprocated relative to the removal plate or an intermediate plate between an aftertreatment position and a waiting position,
wherein, in the aftertreatment position, at least one handling and/or aftertreatment tool comes into contact with a preform held by the removal plate or the intermediate plate or conveys fluid into or removes fluid from same,
wherein the removal plate and/or the intermediate plate and/or the aftertreatment plate is a handling plate that includes the plurality of handling and/or aftertreatment tools arranged in columns and rows, and
wherein spacings between the handling and/or aftertreatment tools are variable within the columns and/or within the rows,
wherein the handling plate has a base element and a plurality of carrier elements which are or can be fixed to the base element,
wherein each carrier element has two receiving means for receiving handling and/or aftertreatment tools,
wherein the tool receiving means of the carrier elements are arranged along a carrier element axis,
wherein each carrier element has at least two receiving surfaces,
wherein the receiving surfaces are arranged in different planes relative to the carrier element axis,
wherein two receiving means are arranged on each receiving surface along the carrier element axis, and
wherein spacing between the tool receiving means in the receiving surfaces differ.

\* \* \* \* \*